Feb. 4, 1958            C. L. GOSS            2,822,072
DEVICE FOR ENGAGING MESHING DRIVING AND DRIVEN MEMBERS
Filed Nov. 13, 1953
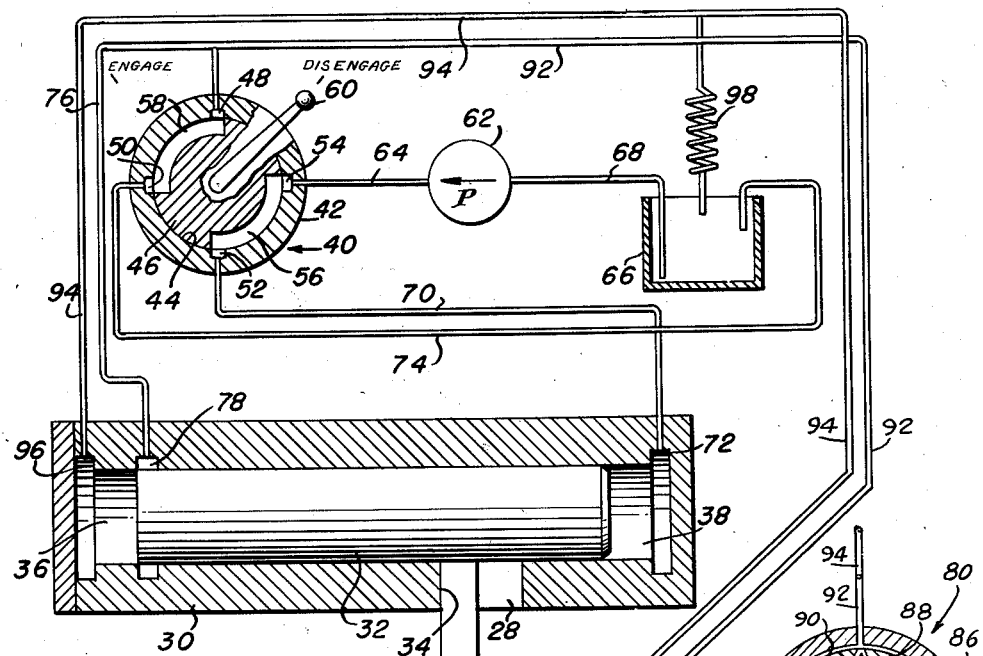
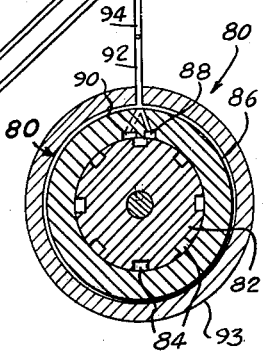
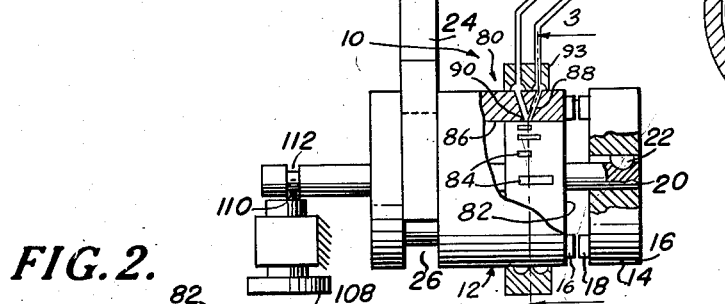
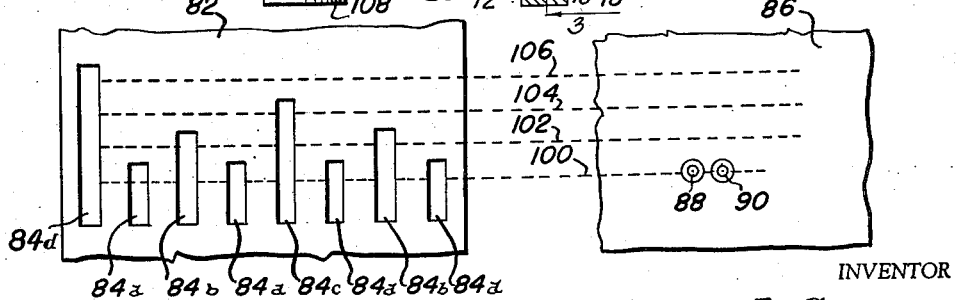
INVENTOR
*Charles L. Goss*
BY *Cushman, Darby & Cushman*
ATTORNEYS United States Patent Office 2,822,072
Patented Feb. 4, 1958

2,822,072

DEVICE FOR ENGAGING MESHING DRIVING AND DRIVEN MEMBERS

Charles L. Goss, Sidney, Ohio, assignor to The Monarch Machine Tool Company, Sidney, Ohio, a corporation of Ohio Application November 13, 1953, Serial No. 391,817

5 Claims. (Cl. 192—86)

This invention relates to meshing driving and driven members, such as gears and jaw clutches, that are engageable and disengageable by axial sliding movements. In particular, this invention relates to means for engaging such members without abutting engagement between the ends of the teeth or jaws thereof.

In moving one of a pair of meshing driving and driven elements into engagement with the other, the ends of the teeth on one member will abut against the ends of the teeth on the other member unless the two members are in a relative angular position that will permit proper meshing of their teeth or jaws. Such abutting of the tooth ends usually is termed in the art as "clashing." When this occurs, the ends of the teeth "hang up" without meshing and no drive is effected. In some instances, the ends of the teeth of axially engageable and disengageable gears are chamfered to reduce clashing. Such chamfering, however, greatly reduces the strength of gear teeth. Further, clashing of either gears or positive clutches may impart damaging jars and undue stresses to the entire power train.

In some power trains, such as in thread chasing machines, it is highly desirable to be able to disengage a pair of driving and driven members and to reengage these members in their same relative angular position of engagement from which they were disengaged, or in only a limited number of predetermined relative angular positions.

Accordingly, it is an object of this invention to provide apparatus for moving driving and driven members into meshing engagement without clashing.

It is another object of this invention to provide apparatus for moving driving and driven members into engagement only when the teeth on such members are in proper position for meshing engagement.

It is another object of this invention to provide apparatus for moving driving and driven elements into meshing engagement only when they are in selected predetermined relative angular positions.

It is a further object of this invention to provide apparatus for accomplishing the foregoing objects that is relatively simple in design.

Other objects and advantages of the invention will become apparent from the following description and accompanying drawings, in which:

Figure 1 is a schematic view of a positive clutch having apparatus embodying this invention for effecting the operation thereof.

Figure 2 is an enlarged fragmentary development of the opposed relatively rotatable surfaces of the timing valve shown in Figure 1.

Figure 3 is a sectional view taken on line 3—3 of Figure 1.

Referring now to the drawings, there is shown in Figure 1 a positive clutch 10 having a rotatable axially-shiftable driving member 12 and a rotatable driven member 14. An annular series of uniformly-spaced jaws or teeth 16 on one end of the driving member 12 is meshable with a complementary series of jaws or teeth 18 on the opposed end of the driven member 14. While there may be any finite number of teeth in each of the series, for purposes of illustration it is assumed that there are eight teeth in each series, so that the teeth on the two members will mesh properly in any one of eight relative angular positions of the members.

The driving member 12 is freely rotatable on a shaft 20 which is axially movable relative to the driving member 12. Power may be supplied to the driving member 12 by any appropriate means (not shown), such as a chain, a belt, or gears. The shaft 20 also is axially movable relative to the driven member 14 which is splined thereon, as by a key 22, and the driven member may be connected to drive a load by any appropriate means (not shown), such as a belt, a chain, gears, etc. Axial movement of the driving member 12 to shift the same into and out of meshing engagement with the driven member 14 is accomplished by a shifter fork 24 riding in circumferential groove 26 in the driving member. The outer end of the fork 24 passes through a longitudinal slot 28 in the side wall of a cylinder 30, disposed parallel to the axis of the clutch members 12 and 14, and is secured to a piston 32 therewithin. Hence, axial movements of the piston 32 shifts the driving member 12 into and out of driving engagement with the driven member 14. One end of the slot 28 in the cylinder 30 serves as a stop 34 for positively limiting the extent of disengaging movement of the driving member 12.

Chambers 36 and 38 are provided between the ends of the piston 32 and the opposed end walls of the cylinder 30 at the full extent of movement of the piston 32 in both directions, so that the admission of pressure fluid into either of the chambers 36 or 38 with the simultaneous exhaust of fluid from the opposite chamber effects corresponding clutch-engaging and disengaging movements of the piston. The supply and exhaust of pressure fluid to and from the cylinder chambers 36 and 38 is controlled by a manual valve 40, which may be of the rotary plug type having a casing 42 provided with a circular valve seat 44 and a plug 46 rotatable therein. The casing has four ports 48, 50, 52, and 54 equally spaced circumferentially about the valve seat 44, while the plug 46 has two diametrically-opposite grooves 56 and 58 each extending circumferentially thereof through a 90° arc. In the position of the plug 46 shown in Figure 1, which corresponds to a clutch-disengaging position, the groove 56 connects the ports 52 and 54, while the groove 58 connects the ports 48 and 50. When the plug 46 is rotated counterclockwise 90°, as by a handle 60, from its clutch-disengaging to a clutch-engaging position, the groove 56 connects the ports 48 and 54, while the groove 58 connects the ports 50 and 52.

Pressure fluid for operating the piston 32 is supplied by a pump 62 which has its outlet connected to the casing port 54 via a conduit 64 and its inlet connected to a sump 66 by a conduit 68. A conduit 70 connects the casing port 52 to a cylinder port 72 opening to the chamber 38, while the valve port 50 is connected to the sump 66 by a conduit 74. Pressure fluid is conducted to and exhausted from the cylinder chamber 36 by a conduit 76 connected to the casing port 48 and to a cylinder port 78. The conduit 76 or the port 78 is controlled, however, by means embodying this invention, so that pressure fluid is not admitted to the chamber 36 to move the driving member 12 into engagement with the driven member 14 unless these clutch members are in relative angular positions wherein meshing engagement of their teeth 16 and 18 can occur without clashing.

Thus, in the clutch-disengaging position of the control valve 40, pressure fluid is admitted into the chamber 38, so that the piston 32 moves to the left until the fork 24 hits the stop 34, as shown in Figure 1, to thus disengage the driving member 12 from the driven member 14. Movement of the valve 40 to the clutch-engaging position vents the chamber 38 to the sump 66 and supplies pressure fluid to the conduit 76. Pressure fluid cannot immediately enter the cylinder chamber 36, however, since, when the piston 32 is in clutch-disengaging position, it just covers the cylinder port 78, the piston 32 and the port 78, in effect, constituting a valve controlling the conduit 76. This invention provides means for opening this valve only when the driving and driven members are in relative angular positions wherein meshing engagement of their teeth can be accomplished without clashing.

To this end, there is a timing device or valve 80 comprising a shaft-like element 82 connected to rotate in synchronism with the driven member 14 and having a plurality of circumferentially-spaced exterior longitudinal grooves 84 corresponding in number and spacing to the driven member teeth 18. Hence, eight such grooves 84 are shown in the drawings. Snugly enclosing the element 82 and connected to rotate thereabout in synchronism with the driving member 12 is an annular element 86 provided with two circumferentially-spaced ports 88 and 90 arranged to be overlapped by one of the grooves 84 in the element 82 whenever the clutch members are substantially in a relative angular position for proper meshing engagement. A conduit 92 is connected to the port 48 of the control valve 40 and, by an appropriate sealed rotatable fluid connection 93, to the port 88 of the timing valve 80. A conduit 94 connects the port 90 of the timing valve 80, by the sealed connection 93, to a third port 96 in the cylinder 30 which opens constantly to the chamber 36 therein.

Consequently, when a groove 84 overlaps the two ports 88 and 90 of the timing valve 80, communication is established therebetween so that when pressure is in the conduit 92 a pressure impulse is transmitted via the conduit 94 to the chamber 36, to thus slightly move the piston 32 in member-engaging direction to thereby uncover the cylinder port 78 sufficiently to permit pressure fluid therein to enter the chamber 36 and effect full member-engaging movement of the piston. It thus is seen that the grooves 84 and ports 88 and 90 in the elements 82 and 86, respectively, constitute means for signalling when the elements are in certain relative angular positions, and that the piston 32 is the recipient of the signal, in this instance a pressure impulse. Preferably, the conduit 94 is vented to the sump 66 via a fluid restriction or resistance 98, so that any leakage from the cylinder port 78 into the chamber 36 cannot build up sufficient pressure therein to cause member-engaging movement of the piston 32. Since the two elements 82 and 86 of the timing valve 80 are driven in synchronism with the driven and driving members 14 and 12, respectively, it will be seen that the timing valve 80 properly synchronizes and times the pressure impulses in conduit 94 to correspond to proper relative angular positions of the clutch members wherein meshing engagement can be effected without clashing of their teeth 16 and 18.

In the embodiment shown, the valve element 82 is integral with or secured (as shown) to the shaft 20, while the annular element 86 is formed as an integral part of the driving element 12. It will be realized, however, that the elements 82 and 86 can be formed and mounted separately from the member 12 and the shaft 20, but driven thereby. For example, the elements 82 and 86 could be mounted beside the driving and driven elements 12 and 14 and gear connected thereto. Furthermore, the rotatable connection 93 which connects the hydraulic lines 92 and 94 to the ports 88 and 90 could be provided in the shifter fork 24, to thus eliminate the rotating friction of one part.

Referring now to Figure 2, there is shown a modification of the invention wherein means are provided for meshing engagement of the driving and driven members 12 and 14 in selected of the eight relative positions thereof wherein meshing engagement can be effected without clashing of their teeth. Thus, for example, while all of the timing valve grooves are circumferentially aligned at one end thereof, the four alternate grooves 84a are of equal short length, two diametrically-opposite grooves 84b are of somewhat longer but equal length, one groove 84c is even longer than the two grooves 84b, and the groove 84d diametrically-opposite the groove 84c is even longer than the latter groove. Thus, if the two ports 88 and 90 of the timing valve are in the axial position 100 relative to the grooves 84, the two ports will be overlapped in succession by all eight grooves 84 during any one revolution of the element 86 relative to the element 82. If, however, the element 82 is shifted axially relative to the element 86 so that the ports 88 and 90 are moved to the relative axial position 102, the ports will be overlapped in succession only by the four grooves 84b, 84c, and 84d. Similarly, further axial shifting of the element 82 to the position 104 will cause the ports 88 and 90 to be overlapped in succession only by the two grooves 84c and 84d, while a still further shifting of the element 82 to the position 106 will cause the two ports 88 and 90 to be overlapped only by the groove 84d during any one revolution of the element 86 relative to the element 82. Thus, the timing valve 80 can be adjusted so that meshing engagement of the driving and driven members 12 and 14 can be effected at any one of the eight possible relative angular positions thereof, only four of these positions, only two of these positions, or only one of these positions.

Referring now to Figure 1, apparatus for accomplishing such relative shifting movement between the timing valve elements 82 and 86 may, when the elements are incorporated in the shaft 20 and the driving member 12, consist of a knob 108 rotatable about an axis normal to a plane including the axis of the shaft 20 and carrying an eccentric pin 110 on one end thereof, which pin rides in a circumferential groove 112 in the shaft 20. Accordingly, rotation of the knob 108 serves to shift the shaft 20 axially relative to the driving member 12.

It thus will be seen that the objects of this invention have been fully and effectively accomplished. It will be realized, however, that the specific embodiment of the invention shown and described for the purpose of illustrating the principles of this invention is subject to change without departure from such principles. Accordingly, the invention includes all modifications encompassed within the spirit and scope of the following claims.

I claim:

1. In a power train the combination comprising: disengageable driving and driven members that will mesh in a plurality of relative angular positions; power-operated means for moving one of said members into and out of engagement with the other; manual means for controlling the application of power to said power-operated means; means independent of contact between said members for signalling when said members are in each of said relative angular positions; means for selectively rendering said signalling means inoperative in at least one of said relative angular positions while simultaneously rendering said signalling means operative in at least one selected position of said relative angular positions; and means responsive to said signalling means for timing the application of member-engaging power to said power-operated means to correspond to said selected relative angular position of said members.

2. In a power train having disengageable driving and driven members that will mesh in a plurality of relative angular positions, the combination comprising: fluid power means for moving one of the members into engagement with the other; manual valve means for controlling the supply of power fluid to said power means; means defining a pair of opposed relatively-rotatable surfaces respectively synchronized with said members; means defining a pair of spaced ports in one of said surfaces; means defining at least one groove in the other of said surfaces disposed to overlap said ports when said members are in one of said relative angular positions; means for supplying fluid under pressure to one of said ports to thereby create a pressure impulse in the other of said ports when overlapped by said groove; and impulse responsive means connected to said other port for timing the application of member-engaging power fluid to said power means to correspond to said one relative angular position of said members.

3. The structure defined in claim 2 in which the surfaces are cylindrical and axially shiftable and there are a plurality of grooves of different lengths disposed to overlap said ports in relative angular positions of said surfaces corresponding to the relative angular position of the members, shifting of said surfaces serving to move said grooves into and out of port-overlapping zones for meshing engagement of the members only at selected of said relative angular positions thereof and including means for shifting said surfaces.

4. The structure defined in claim 2 in which the impulse responsive means includes a valve, the movable member of which forms a part of said fluid power means.

5. The structure defined in claim 2 in which the power means includes a cylinder having a power fluid inlet port in a side wall thereof and a piston therewithin covering said port when the members are disengaged, and the impulse responsive means includes means defining a pressure chamber having one end surface of said piston constituting a wall thereof for initiating movement of said piston to uncover said port.

References Cited in the file of this patent

UNITED STATES PATENTS

| | | |
|---|---|---|
| 1,322,172 | Alexander | Nov. 18, 1919 |
| 1,491,804 | Kiefer | Apr. 29, 1924 |
| 1,686,827 | Maag | Oct. 9, 1928 |
| 2,120,092 | Doran | June 7, 1938 |
| 2,568,007 | Jandasek | Sept. 18, 1951 |
| 2,603,327 | King | July 15, 1952 |
| 2,633,954 | Allen | Apr. 7, 1953 |

FOREIGN PATENTS

| | | |
|---|---|---|
| 480,928 | Germany | Aug. 10, 1929 |
| 227,811 | Great Britain | Mar. 11, 1926 |